(12) United States Patent
Adler et al.

(10) Patent No.: US 7,714,053 B2
(45) Date of Patent: May 11, 2010

(54) RUBBER COMPOUND

(75) Inventors: Matthias Adler, Heppenheim (DE); Ruth Bieringer, Bobenheim-Roxheim (DE); Michael Viol, Heidelberg (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 11/991,969

(22) PCT Filed: Sep. 16, 2006

(86) PCT No.: PCT/EP2006/009035

§ 371 (c)(1),
(2), (4) Date: Aug. 1, 2008

(87) PCT Pub. No.: WO2007/033801

PCT Pub. Date: Mar. 29, 2007

(65) Prior Publication Data

US 2008/0315148 A1    Dec. 25, 2008

(30) Foreign Application Priority Data

Sep. 21, 2005    (DE) .................. 10 2005 045 167

(51) Int. Cl.
*C08K 3/18* (2006.01)
*C08G 18/42* (2006.01)

(52) U.S. Cl. ..................... 524/430; 524/500

(58) Field of Classification Search ............ 524/430
See application file for complete search history.

(56) References Cited

U.S. PATENT DOCUMENTS

| | | | |
|---|---|---|---|
| 6,743,862 B2 * | 6/2004 | Hakuta et al. | ............. 525/105 |
| 6,844,393 B2 | 1/2005 | Goto et al. | |
| 6,875,534 B2 | 4/2005 | Nakamura et al. | |
| 2003/0013818 A1 | 1/2003 | Hakuta et al. | ........... 525/331.9 |
| 2003/0166795 A1 * | 9/2003 | Hasegawa et al. | ........... 525/479 |
| 2005/0020740 A1 * | 1/2005 | Matsunaga et al. | ......... 524/261 |
| 2006/0142437 A1 | 6/2006 | Hakuta et al. | |

FOREIGN PATENT DOCUMENTS

| | | |
|---|---|---|
| EP | 0776937 | 6/1997 |
| EP | 0999236 | 5/2000 |
| EP | 1006150 | 6/2000 |
| EP | 1075034 | 2/2001 |
| EP | 1085034 | 2/2001 |
| EP | 1146082 | 10/2001 |
| EP | 1 277 804 | 1/2003 |
| EP | 1277804 | 1/2003 |
| EP | 1464670 | 10/2004 |
| EP | 1 526 155 | 4/2005 |
| EP | 1548867 | 6/2005 |
| EP | 1698659 | 9/2006 |
| JP | 11100508 | 4/1999 |
| JP | 2000124475 | 4/2000 |
| JP | 2000136275 | 5/2000 |
| JP | 2005 068268 | 3/2005 |
| WO | WO 99/03927 | 1/1999 |
| WO | WO 2004/083299 | 9/2004 |
| WO | WO 2007/035401 | 3/2007 |

OTHER PUBLICATIONS

Baranwal and Jacobs, Effect on Molecular Weight and Molecular Weight Distribution of EPDM Polymer and SBR, Journal of Applied Polymer Science, 1969, vol. 13, pp. 797-805.
U.S.P.T.O. Office Action dated Jul. 20, 2009 for U.S. Appl. No. 11/992,451.
U.S.P.T.O. Office Action dated Jul. 20, 2009 for U.S. Appl. No. 11/992,342.

* cited by examiner

*Primary Examiner*—Ling-Siu Choi
*Assistant Examiner*—Hui Chin
(74) *Attorney, Agent, or Firm*—Pearl Cohen Zedek Latzer, LLP

(57) ABSTRACT

A method for producing a rubber compound wherein the mechanical properties thereof are improved. In particular, the rubber compound has an increased elongation at rupture and/or increased tensile strength and/or increased tear strength and also a reduced compression set (DVR). The rubber compound includes a rubber which has at least two functional groups which can be cross-linked by hydrosilylation, a cross-linking agent consisting of hydrosiloxane or a hydrosiloxane derivative or a mixture of several hydrosiloxanes or derivatives, which include at least two SiH-groups per molecule in the center, a hydrosilylation catalyst system, at least one filling material and a coagent which can be cross-linked by hydrosilylation.

31 Claims, No Drawings

RUBBER COMPOUND

This application is a national phase of International Application No. PCT/EP2006/009035, filed Sep. 16, 2006, which claims priority to DE 10 2005 045 167.5, filed Sep. 21, 2005.

The present invention relates to a rubber compound, a method for manufacturing same and use of same. The rubber compound is to be used in particular as a material in the areas of production, shipping, process engineering and the packaging of foods, in particular drinking water or medical pharmaceutical products or in the field of the electronics industry.

BACKGROUND

EP 1 075 034 A1 describes the use of polyisobutylene or perfluoropolyether crosslinked by hydrosilylation as a sealing material in a fuel cell.

U.S. Pat. No. 6,743,862 B2 describes a crosslinkable rubber composition, preferably of ethylene-propylene-diene monomer, having a compound containing at least two SiH groups and optionally a platinum catalyst and use of same as a sealing material.

EP 1 277 804 A1 describes compositions of a vinyl polymer having at least one hydrosilylation-crosslinkable alkenyl group, a compound having a component that contains a hydrosilyl group, a hydrosilylation catalyst and an aliphatic unsaturated compound having a molecular weight of no more than 600 g/mol.

During crosslinking of rubber by hydrosilylation, terminal double bonds are critical. No unwanted cleavage products that might migrate are formed during crosslinking. Consequently, these rubber compositions are most suitable for applications in which a clean environment is particularly important, e.g., in fuel cells, in the medical field or in the field of food packaging.

In addition, it is desirable to improve the mechanical properties of the types of rubber used, in particular with regard to tensile strength, elongation at break and/or the compression set (DVR) to adjust to the special loads in the aforementioned application ranges.

A reduction in the compression set (DVR) has previously been achieved by increasing the crosslinking density. This results in an increase in hardness, but the elongation at break frequently also declines, which leads to problems in many applications.

SUMMARY OF THE INVENTION

The object of the present invention is to improve upon the mechanical properties of rubber, in particular to increase the elongation at break and/or the tensile strength and/or the tear propagation resistance while reducing the compression set (DVR).

The rubber compound includes according to the present invention a rubber (A) having at least two hydrosilylation-crosslinkable functional groups as the crosslinking agent (B), a hydrosiloxane or hydrosiloxane derivative or a mixture of different hydrosiloxanes or derivatives having an average of at least two SiH groups per molecule, a hydrosilylation catalyst system (C), at least one filler substance (D) and a hydrosilylation-crosslinkable coagent (E).

In a preferred embodiment, the rubber compound additionally includes at least one additive (F).

For an improvement in the mechanical properties of rubbers, in particular for an increase in the elongation at break, the tensile strength and/or the tear propagation resistance with a reduction in the compression set (DVR) at the same time, the following components are advantageously used for the rubber compound:

100 phr of rubber (A)

an amount of crosslinking agent (B) such that the ratio of SiH groups to the hydrosilylation-crosslinkable functional groups is 0.2 to 20, preferably 0.5 to 5, most preferably 0.8 to 1.2, 0.05 to 100,000 ppm, preferably 0.1 to 5,000 ppm of the hydrosilylation catalyst system (C), 5 to 800 phr of the at least one filler (D), preferably 10 to 200 phr for nonmagnetic fillers, preferably 200 to 600 phr for magnetic or magnetizable fillers, and 0.1 to 30 phr, preferably 1 to 10 phr of the coagent (E).

In a preferred embodiment, the rubber compound additionally includes 0.1 to 20 phr of the at least one additive (F).

The abbreviation phr means parts per hundred rubber, so it indicates the parts by weight per 100 parts by weight of rubber.

The preferred rubber compounds have proven to be those in which the rubber (A) is selected from ethylene-propylene-diene rubber (EPDM), in which the diene is preferably a norbornene derivative having a vinyl group, preferably 5-vinyl-2-norbornene, isobutylene-isoprene-divinylbenzene rubber (IIR terpolymer), isobutylene-isoprene rubber (IIR), butadiene rubber (BR), styrene-butadiene rubber (SBR), styrene-isoprene rubber (SIR), isoprene-butadiene rubber (IBR), isoprene rubber (IR), acrylonitrile-butadiene rubber (NBR), chloroprene rubber (CR), acrylate rubber (ACM) or partially hydrogenated rubber from butadiene rubber (BR), styrene-butadiene rubber (SBR), isoprene-butadiene rubber (IBR), isoprene rubber (IR), acrylonitrile-butadiene rubber (NBR), polyisobutylene rubber (PIB) having two vinyl groups or functionalized rubber, e.g., perfluoropolyether rubber functionalized with maleic anhydride or derivatives thereof or with vinyl groups.

A highly preferred rubber compound has as the rubber (A) ethylene-propylene-diene rubber (EPDM) with a vinyl group in the diene, polyisobutylene (PIB) having two terminal vinyl groups, acrylonitrile-butadiene rubber (NBR) or acrylate rubber (ACM).

The average molecular weight of the rubber (A) is advantageously between 5,000 and 100,000 g/mol, preferably between 5,000 and 60,000 g/mol.

The following are preferred as the crosslinking agent (B): a compound of formula (I) containing SiH:

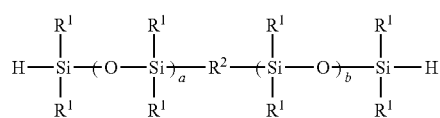

where $R^1$ stands for a saturated hydrocarbon group or an aromatic hydrocarbon group which is monovalent, has 1 to 10 carbon atoms and is substituted or unsubstituted, where a stands for integral values from 0 to 20 and b stands for integral values from 0 to 20, and $R^2$ stands for a divalent organic group having 1 to 30 carbon atoms or oxygen atoms, a compound of formula (II) containing SiH:

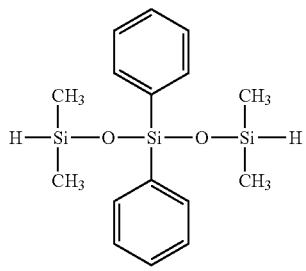

and/or
a compound of formula (III) containing SiH:

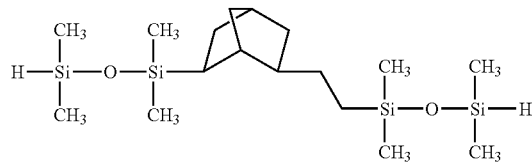

The crosslinking agent (B) is preferably selected from poly(dimethylsiloxane-co-methylhydrosiloxane), tris(dimethylsilyloxy)phenylsilane, bis(dimethylsilyloxy)diphenylsilane, polyphenyl(dimethylhydrosiloxy)siloxane, methylhydrosiloxane-phenylmethylsiloxane copolymer, methylhydrosiloxane-alkylmethylsiloxane copolymer, polyalkylhydrosiloxane, methylhydrosiloxane-diphenylsiloxane-alkylmethylsiloxane copolymer and/or from polyphenylmethylsiloxane-methylhydrosiloxane.

Poly(dimethylsiloxane-comethylhydrosiloxane) has proven to be suitable in particular for creating networks for difunctional vinyl rubber, such as polyisobutylene having two terminal double bonds.

Tris(dimethylsilyloxy)phenylsilane or bis(dimethylsilyloxy)diphenylsilane has proven to be a particularly suitable crosslinking agent for rubbers having more than two hydrosilylation-crosslinkable functional groups in the molecule, e.g., for ethylene-propylene-diene rubber (EPDM) with 5-vinyl-2-norbornene as the diene.

The hydrosilylation catalyst system (C) is preferably selected from platinum(0)-1,3-divinyl-1,1,3,3-tetramethyldisiloxane complex, hexachloroplatinic acid, dichloro(1,5-cyclooctadiene)platinum(II), dichloro(dicyclopentadienyl)platinum(II), tetrakis(triphenylphosphine)platinum(0), chloro(1,5-cyclooctadiene)rhodium(I) dimer, chlorotris(triphenylphosphine)rhodium(I) and/or dichloro(1,5-cyclooctadiene)palladium(II), optionally in combination with a kinetic regulator selected from dialkyl maleate, in particular dimethyl maleate, 1,3,5,7-tetramethyl-1,3,5,7-tetravinylcyclosiloxane, 2-methyl-3-butyn-2-ol and/or 1-ethynylcyclohexanol.

The at least one filler (D) is advantageously selected from furnace black, flame black and/or channel black, silica, metal oxide, metal hydroxide, carbonate, silicate, surface-modified and/or hydrophobized, precipitated and/or pyrogenic silica, surface-modified metal oxide, surface-modified metal hydroxide, surface-modified carbonate such as chalk or dolomite, surface-modified silicate such as kaolin, calcined kaolin, talc, powdered quartz, diatomaceous earth, layered silicate, glass beads, fibers and/or organic fillers such as ground wood and/or cellulose.

Hydrophobic and/or hydrophobized silicas may be incorporated very well into apolar rubbers and cause a smaller increase in viscosity and better mechanical values than unmodified silicas.

The coagent (E) is advantageously selected from 2,4,6-tris(allyloxy)-1,3,5-triazine (TAC), triallyl isocyanurate (TAIC), 1,2-polybutadiene, 1,2-polybutadiene derivatives, diacrylates, triacrylates, in particular trimethylpropane triacrylate, dimethacrylates and/or trimethacrylates, in particular trimethylolpropane trimethacrylate (TRIM), triallyl phosphonate esters and/or butadiene-styrene copolymers having at least two functional groups attached to the rubber (A) by hydrosilylation.

The following additives (F) are used:
antiaging agents, e.g., UV absorbers, UV screeners, hydroxybenzophenone derivatives, benzotriazo derivatives or triazine derivatives,
antioxidants, e.g., hindered phenols, lactones or phosphites,
ozone protectants, e.g., paraffinic waxes,
flame retardants,
hydrolysis protectants such as carbodiimide derivatives,
adhesive mediators such as silanes having functional groups that bind to the rubber matrix by hydrosilylation, e.g., with vinyl trimethoxysilane, vinyl triethoxysilane, polymers modified with functionalized rubbers, e.g., maleic acid derivatives, e.g., maleic anhydride,
mold release agents and/or agents to reduce the tackiness of components, e.g., waxes, fatty acid salts, polysiloxanes, polysiloxanes having functional groups that bind to the rubber matrix by hydrosilylation and/or
dyes and/or pigments,
plasticizers and/or
processing aids.

Furthermore, a method for producing a rubber compound should be made available in which no byproducts that need be removed in a complex manner are created during crosslinking. No cleavage products that could migrate and cause problems for application in the medical field or in the field of food packaging should be released. Furthermore, the crosslinking with a comparatively small quantity of a hydrosilylation catalyst system should proceed more rapidly than with conventional materials.

For manufacturing a rubber compound according to the present invention, first the crosslinking agent (B) and the hydrosilylation catalyst system (C) are added as a single-component system or as a two-component system to the rubber (A) mixed with at least one filler (D) and the coagent (E) and/or the at least one additive (F), then all the components are mixed.

With the single-component system, the crosslinking agent (C) and the hydrosilylation catalyst system (D) are added to the aforementioned other components in a system and/or container. In the case of the two-component system, however, the crosslinking agent (C) and the hydrosilylation catalyst system (D) are added separately from one another, i.e., in two systems or containers, each mixed first with one part of a mixture of the other components until achieving a homogeneous distribution before the two systems, i.e., the mixture with the crosslinking agent (C) and the mixture with the hydrosilylation catalyst system (D) are combined and all the components are mixed together. The two-component system has the advantage that the two mixtures in which the crosslinking agent (C) and the hydrosilylation catalyst system (D) are separate from one another are stable for a longer period of time than a mixture that contains both the crosslinking agent (C) and the hydrosilylation catalyst system (D).

Then the product is processed by an injection molding method and/or a (liquid) injection molding method ((L)IM) by pressing and/or a compression molding method (CM), by a transfer molding method (TM) or by a method derived therefrom, a printing method such as screen printing, by spot application, by dipping or spraying.

The aforementioned rubber compound according to the present invention may be used in a variety of applications. They are advantageously used as a material in the areas of production, shipping, process engineering and packaging of foods, in particular drinking water or medical or pharmaceutical products or in the area of the electronics industry.

Rubber compounds that crosslink in particular in the presence of a platinum catalyst by hydrosilylation have a particular cleanliness.

With the traditional crosslinking, sulfur compounds for example plus activators or peroxides are used. During the chemical reaction leading to crosslinking, byproducts are formed at the site of formation of the new chemical bond. These byproducts remain in the rubber matrix and cannot be removed completely, not even by prolonged post-heating of the molded part. Likewise, fluids diffusing into the rubber matrix are capable of releasing these byproducts and transporting them to the surface of the mold through diffusion processes. They are thus available there for adjacent fluids or surfaces and may result in a contamination that would be objectionable from a health standpoint in particular, e.g., for applications in the area of drinking water or the food industry. This is specifically not the case with the rubber compound according to the present invention, so these compounds may be considered preferable for use in the aforementioned areas.

The same is also true in medical technology, e.g., for components of dialysis equipment. Release of byproducts is to be avoided here just as much, and that is ensured by using the rubber compound according to the present invention.

The crosslinking reaction by hydrosilylation, in particular using a platinum catalyst, is an addition reaction for linkage of the crosslinking bond. No byproducts are formed here that might escape from the rubber matrix by diffusion.

The rubber compounds according to the present invention are therefore particularly clean materials suitable for use in the fields of food technology, drinking water technology or medical technology, pharmacy and/or electronics.

The rubber compounds according to the present invention are preferably suitable materials for gaskets such as loose or integrated gaskets, e.g., O-rings or groove rings, adhesive seals, soft metal seals or impregnations, for coatings, membranes or adhesive compounds for hoses, valves, pumps, filters, humidifiers, reformers, storage vessels (tanks), vibration dampers, acoustically active components, for coatings on woven and nonwoven fabrics, electromagnetic shields, tires, brake sleeves, brake parts, axle boots, folded bellows and/or for elastomer floor coverings and/or sections.

O-rings or flat gaskets for dialysis equipment, for example, are therefore preferably manufactured from the rubber compound according to the present invention for use in medical technology.

These extremely clean rubber compounds according to the present invention may therefore also be used to advantage, e.g., in so-called valve seals which provide seals for adjusting valves for regulating the fluid conveyance in pipelines in the food industry.

The rubber compounds according to the present invention are also preferably used for membranes, O-rings or flange gaskets in the area of drinking water or in the production of pharmaceutical products.

DETAILED DESCRIPTION OF THE INVENTION

The subject matter of the present invention will now be explained in greater detail on the basis of a few examples.

A rubber (A), a filler (D) and a coagent (E) are mixed thoroughly at temperatures between 30° C. and 60° C. in a DAC 400 FVZ SpeedMixer from the company Hausschild & Co. KG until achieving a homogeneous distribution of the components. Then a crosslinking agent (B) and a hydrosilylation catalyst system (C) are added and the mixture is mixed further until achieving a homogeneous distribution of the components.

Under vulcanization conditions at 150° C., 2 mm thick plates are pressed from this mixture, e.g., in a press.

Ethylenepropylene-5-vinyl-2-norbornene rubber from Mitsui Chemicals having a norbornene content of 5.3 wt % and an average molecular weight of 31,000 g/mol is used as rubber (A) (Mitsui EPDM) or polyisobutylene (PIB) having two vinyl groups and an average molecular weight of 16,000 g/mol from the company Kaneka (EPION-PIB (EP 400)).

The hydrosilylation crosslinking agent (B) used for the Mitsui EPDM is tris(dimethylsilyloxy)phenylsilane from the company Shin Etsu. This crosslinking agent is very suitable for a rubber having more than two vinyl groups in the molecule.

For the Mitsui EPDM, 2,5-dimethyl-2,5-di(tert-butylperoxy)hexane (Luperox 101 XL-45) from Arkema Inc. is used as the peroxide crosslinking agent.

The hydrosilylation crosslinking agent (B) used for the terminally functionalized polyisobutylene having two vinyl groups (EPION-PIB (EP400)) is poly(dimethylsiloxane-comethylhydrosiloxane) from the company Kaneka (CR 300). CR 300 has more than three SiH groups per molecule and is therefore highly suitable for creating networks for difunctional vinyl rubbers such as the polyisobutylene having two vinyl groups.

A so-called Karstedt catalyst, namely platinum(0)-1,3-divinyl-1,1,3,3-tetramethyldisiloxane complex dissolved in xylene to form a 5% solution and used in combination with dimethyl maleate as a kinetic regulator, is used as the hydrosilylation catalyst system (C).

The filler (D) used is hydrophobicized pyrogenic silica (Aerosil R8200) from the company Degussa. Hydrophobic and/or hydrophobicized silicas may be incorporated particularly well into apolar rubbers and produce a smaller increase in viscosity and a better compression set (DVR) in comparison with silicas not modified at the surface.

Triallyl isocyanurate (TAIC) from Nordmann, Rassmann GmbH or 1,2-polybutadiene (Nisso-PB B-3000) from Nippon Soda Co., Ltd or trimethylolpropane triacrylate (Saret 519) from Sartomer is used as the hydrosilylation-crosslinkable coagent (E).

The present invention may be understood better by reference to the following examples from Tables I through IV.

The rubber compound with and without coagent are subjected to the following tests:

Hardness [Shore A] according to DIN 53505,

Tensile strength [MPa],

Modulus (stress value) 100% [MPa] and

Elongation at break [%] according to DIN 53504-S2,

Compression set (DVR) [%] according to DIN ISO 815, (25% deformation, 24 hours and/or 70 hours, 120° C. and/or 150° C. in air) and Tear propagation resistance [N/mm] according to DIN 53507-A.

Tables Ia and Ib show examples in which ethylenepropylene-5-vinyl-2-norbornene rubber from Mitsui Chemicals is used as the rubber (A).

Tris(dimethylsilyloxy)phenylsilane is used in a dosage adapted to the double bonds introduced by the coagent (E) as the hydrosilylation crosslinking agent (B) for the Mitsui EPDM.

TABLE Ia

| Example | Hydrosilylation compound with coagent Nisso-PB | Hydrosilylation compound with coagent TAIC | Hydrosilylation compound without coagent | Peroxide compound with coagent TAIC | Peroxide compound without coagent |
|---|---|---|---|---|---|
| Rubber (A): Mitsui EPDM [phr] | 100 | 100 | 100 | 100 | 100 |
| Hydrosilylation crosslinking agent (B): tris(dimethylsilyloxy)-phenylsilane [phr] | 5 | 6 | 4 | | |
| Peroxide crosslinking agent [phr] | | | | 4 | 4 |
| Catalyst system (C): ≈450 ppm catalyst/regulator [µL] | 56/36 | 56/36 | 56/36 | | |
| Filler (D): Aerosil R8200 [phr] | 20 | 20 | 20 | 20 | 20 |
| Coagent (E): [phr] | | | | | |
| TAIC | | 2 | | 2 | |
| Nisso-PB B-3000 | 1 | | | | |
| Hardness [Shore A] | 40 | 46 | 38 | 52 | 46 |
| Tensile strength [MPa] | 1.6 | 1.5 | 1.4 | 2 | 1.5 |
| Modulus 100% [MPa] | 0.9 | 1.3 | 1 | | 1.3 |
| Elongation at break [%] | 153 | 115 | 129 | 83 | 109 |
| Tear propagation resistance [N/mm] | 0.9 | 0.6 | 0.7 | | |
| Compression set 120° C., 24 h [%]) | 20 | 10 | 25 | 9 | 11 |

As is known, a number of side reactions may occur during crosslinking of EPDM with peroxides, but they may also be suppressed to some extent by using coagents.

The addition of a coagent, e.g., 1,2-polybutadiene (Nisso-PB B-3000) or triallyl isocyanurate (TAIC) during peroxide crosslinking of the Mitsui EPDM also acts by increasing the hardness and reducing the compression set (DVR) due to the increase in the crosslinking density, but also results in an unwanted decline in elongation at break.

In the case of the Mitsui EPDM crosslinked by hydrosilylation, adding the coagent 1,2-polybutadiene (Nisso-PB B-3000) or triallyl isocyanurate (TAIC) has the effect of increasing hardness and increasing tensile strength due to the increase in crosslinking density. Adding a coagent (E) also results in a definite reduction in permanent deformation of the rubber under load, i.e., in a decline in the compression set value (DVR).

The elongation at break surprisingly increases in Mitsui EPDM crosslinked by hydrosilylation in contrast with Mitsui EPDM with peroxide crosslinking, in particular on addition of 1,2-polybutadiene (Nisso-PB B-3000) as the coagent.

The elongation at break is also increased in particular by addition of diacrylates, e.g., 1,6-hexanediol diacrylate (SR 238) from the company Sartomer as shown in Table Ib.

TABLE Ib

| Example | Hydrosilylation compound with coagent (SR 238) | Hydrosilylation compound without coagent |
|---|---|---|
| Rubber (A): Mitsui EPDM [phr] | 100 | 100 |
| Hydrosilylation crosslinking agent (B): CR 300 [phr] | 4 | 4 |
| Catalyst system (C): Catalyst/regulator [phr]/[µL] dimethyl maleate | 0.2/35 | 0.2/35 |
| Filler (D): Aerosil R8200 [phr] | 20 | 20 |
| Coagent (E): [phr] 1,6-hexanediol diacrylate (SR 238) | 1 | |
| Hardness [Shore A] | 32 | 38 |
| Tensile strength [MPa] | 1.7 | 1.4 |
| Modulus 100% [MPa] | 0.9 | 1 |
| Elongation at break [%] | 162 | 129 |
| Compression set DVR 120° C., 24 h [%] | 18 | 25 |
| Compression set DVR 120° C., 70 h [%] | 26 | 40 |

These positive effects open up improved possible applications for this rubber compound in numerous fields of use.

Table IIa shows examples in which polyisobutylene (PIB) with two vinyl groups from Kaneka is used as the rubber (A) (EPION-PIB (EP400)).

Poly(dimethylsiloxane-comethylhydrosiloxane) from Kaneka (CR 300) is used as the hydrosilylation crosslinking agent (B) for polyisobutylene terminally functionalized with two vinyl groups (EPION-PIB (EP400)), the dosage being adapted to the double bonds introduced by the coagent (E).

In the case of polyisobutylene with two vinyl groups (EPION-PIB (EP400)) crosslinked by hydrosilylation, the addition of trimethylolpropane triacrylate (Saret 519) as coagent (E) results in an increase in tensile strength and a decline in the compression set (DVR) at 120° C.

The elongation at break surprisingly increases in the case of polyisobutylene with two vinyl groups crosslinked by hydrosilylation (EPION-PIB (EP400)) when the coagent (E) is added. The tear propagation resistance is also increased by adding coagent (E).

TABLE IIa

| Example | Hydrosilylation compound with coagent Saret 519 | Hydrosilylation compound with coagent Saret 519 | Hydrosilylation compound without coagent |
|---|---|---|---|
| Rubber (A): EPION-PIB (EP400) [phr] | 100 | 100 | 100 |
| Crosslinking agent (B): CR-300 [phr] | 6.5 | 8 | 4 |
| Catalyst system (C): ≈450 ppm HS-KA catalyst/regulator [µL] | 56/36 | 56/36 | 56/36 |
| Filler (D): Aerosil R8200 [phr] | 20 | 20 | 20 |
| Coagent (E): Saret 519 [phr] | 2 | 2 | |
| Hardness [Shore A] | 29 | 35 | 35 |
| Tensile strength [MPa] | 2.7 | 2.9 | 2.6 |
| Modulus 100% [MPa] | 0.6 | 0.7 | 0.7 |
| Elongation at break [%] | 328 | 299 | 261 |
| Tear propagation resistance [N/mm] | 2.5 | 2.3 | 2 |
| Compression set DVR 120° C., 24 h [%] | 31 | 28 | 33 |

TABLE IIb

| Example | Hydrosilylation compound with coagent Nisso-PB B-3000 | Hydrosilylation compound with coagent TAIC | Hydrosilylation compound without coagent |
|---|---|---|---|
| Rubber (A): EPION-PIB (EP400) [phr] | 100 | 100 | 100 |
| Crosslinking agent (B): CR-300 [phr] | 8.5 | 8.5 | 4 |
| Catalyst system (C): catalyst/regulator [phr]/[µL] dimethyl maleate | 0.2/35 | 0.2/35 | 0.2/35 |
| Filler (D): Aerosil R8200 [phr] | 20 | 20 | 20 |
| Coagent (E): [phr] | | | |
| Nisso-PB B-3000 | 1 | | |
| TAIC | | 1 | |
| Hardness [Shore A] | 32 | 37 | 35 |
| Tensile strength [MPa] | 3.4 | 3.2 | 2.6 |
| Modulus 100% [MPa] | 0.6 | 0.8 | 0.7 |
| Elongation at break [%] | 359 | 270 | 261 |
| Compression set 120° C., 24 h [%] | 55 | 30 | 33 |
| Compression set 120° C., 70 h [%] | 70 | 35 | |

Table IIb shows how addition of the coagent 1,2-polybutadiene (Nisso-PB B-3000) and/or triallyl isocyanurate (TAIC) affects various mechanical properties.

When adding these coagents (E) the hydrosilylation compound has elevated tensile strength values with polyisobutylene and has surprisingly elevated elongation at break properties, as also found by adding trimethylolpropane triacrylate (Saret 519).

The compression set values after 24 hours at 120° C. in air are also reduced by adding acrylate and triallyl isocyanurate (TAIC).

The hardness values are increased here by the addition of a coagent (E) as are the tensile strength values. The same is also true of the tear propagation resistance on addition of the coagent (E).

The hydrosilylation compounds with the coagent triallyl isocyanurate (TAIC) even show somewhat stronger tensile strength, elongation at break and tear propagation resistance values as well as a slightly lower compression set value in comparison with the values obtained with the coagent 1,2-polybutadiene (Nisso-PB B-3000).

TABLE III

| Example | Hydrosilylation compound with coagent TAC | Hydrosilylation compound with coagent Nisso-PB B-3000 | Hydrosilylation compound without coagent |
|---|---|---|---|
| Rubber (A): Perbunan-NBR [phr] | 100 | 100 | 100 |
| Crosslinking agent (B): CR-300 [phr] | 10 | 10 | 10 |
| Catalyst system (C): catalyst/regulator [phr]/[µL] | 0.2/0.04 | 0.2/0.04 | 0.2/0.04 |
| Filler (D): Aerosil R8200 [phr] | 60 | 60 | 60 |
| Coagent (E) [phr]: | | | |
| TAIC | 2.5 | | |
| Nisso-PB B-3000 | | 2.5 | |
| Hardness [Shore A] | 76 | 78 | 75 |
| Tensile strength [MPa] | 9.2 | 8.7 | 6.2 |
| Modulus 100% [MPa] | 4.4 | 7.7 | 2.9 |
| Modulus 200% [MPa] | 8.4 | | 5.2 |
| Elongation at break [%] | 228 | 116 | 236 |
| Tear propagation resistance [N/mm] | 12.2 | 11.7 | 10 |
| Compression set 120° C., 24 h | 20 | 21 | 18 |

In the examples listed in Table III, solid acrylonitrile butadiene rubber (NBR) from the company Lanxess is used as the rubber (A) (Perbunan 2845 F).

The data in Table III show in addition to the rubber (A) without coagent and with coagent (E), how the addition of a hydrosilylation-crosslinkable coagent (E) affects the mechanical properties in the example of using the coagent triallyl isocyanurate (TAIC) and/or 1,2-polybutadiene (Nisso-PB B-3000).

Furthermore, the measured data listed in Table IV from the experimental examples with hydrosilylation compounds with acrylate rubber (ACM OR 100 A) from Kaneka as the rubber (A), both with and without coagent (E), e.g., using the coagent triallyl isocyanurate (TAIC), triacrylate (Saret 519) and/or 1,2-polybutadiene (Nisso-PB B-3000), show the effects of adding a hydrosilylation-crosslinkable coagent (E) on the mechanical properties.

TABLE IV

| Example Hydrosilylation compound | with coagent TAIC | with coagent TAIC | with coagent Saret 519 | with coagent Saret 519 | with coagent Nisso-PB B-3000 | without coagent |
|---|---|---|---|---|---|---|
| Rubber (A): ACM [phr] | 100 | 100 | 100 | 100 | 100 | 100 |
| Crosslinking agent (B): CR-500 [phr] | 15.5 | 17 | 12 | 14 | 12 | 6 |
| Catalyst system (C): Pt-VTSc/dimethyl maleate catalyst/regulator [µL]/[µL] | 47/32 | 47/32 | 47/32 | 47/32 | 47/32 | 47/32 |
| Filler (D): Aerosil R8200 [phr] | 30 | 30 | 30 | 30 | 30 | 30 |
| Coagent (E): | | | | | | |
| TAIC | 2 | 2 | | | | |
| Saret 519 | | | 2 | 2 | | |

TABLE IV-continued

| Example<br>Hydrosilylation<br>compound | with<br>coagent<br>TAIC | with<br>coagent<br>TAIC | with<br>coagent<br>Saret<br>519 | with<br>coagent<br>Saret<br>519 | with<br>coagent<br>Nisso-PB<br>B-3000 | without<br>coagent |
|---|---|---|---|---|---|---|
| Nisso-PB B-3000 | | | | | 2 | |
| Additive (F): [phr]<br>ASM Anox 20 (BASF) | 1 | 1 | 1 | 1 | 1 | 1 |
| Density [g/cm³]<br>DIN EN ISO 1183 | 1.23 | 1.23 | 1.24 | 1.23 | 1.24 | 1.21 |
| Hardness [Shore A] | 33 | 36 | 25 | 30 | 27 | 22 |
| Tensile strength [MPa] | 3.4 | 4.1 | 3 | 3.3 | 3.1 | 2.4 |
| Elongation at break [%] | 167 | 164 | 240 | 215 | 220 | 224 |
| Compression set 150° C., 70 h [%] | 23 | 9 | 36 | 19 | 50 | 41 |

The hardness values are increased here by adding a coagent (E) as are the tensile strength values. The improvement in the compression set value after 70 hours at 150° C. by adding a coagent from the group of acrylates, as demonstrated by triacrylate (Saret 519) and most preferably by adding the coagent triallyl isocyanurate (TAIC), should be emphasized here.

It is clear from the examples given in the tables that the rubber compounds including as rubber (A) in particular ethylenepropylenediene rubber (EPDM), polyisobutylene (PIB), acrylonitrile butadiene rubber (NBR) or acrylate rubber (ACM) and as coagent (E) triallyl isocyanurate (TAIC), 1,2-polybutadiene, triacrylates (Saret 519) or diacrylates, 1,6-hexanediol diacrylate (SR 238) have particularly advantageous mechanical properties that are particularly advantageous for a variety of areas of application.

Hydrosilylation compounds containing as coagents 1,2-polybutadiene or ether groups tend to have slightly inferior mechanical properties, in particular with regard to thermal aging, which is apparent from the compression set values at 120° C. and higher temperatures, for example.

The invention claimed is:

1. A rubber compound, comprising:
a rubber having at least two hydrosilylation-crosslinkable functional groups, the rubber being selected from the group consisting of ethylene-propylene-diene rubber (EPDM), polyisobutylene rubber, acrylonitrile-butadiene rubber and acrylate rubber;
a hydrosiloxane or hydrosiloxane derivative or a mixture of several hydrosiloxanes or derivatives having on the average at least two SiH groups per molecule as a crosslinking agent;
a hydrosilylation catalyst system,
at least one filler, and
a hydrosilylation-crosslinkable coagent selected from the group consisting of 1,2-polybutadiene, 1,6-hexanediol diacrylate, trimethylpropane triacrylate and triallyl isocyanurate;
wherein the rubber is crosslinked without a peroxide.

2. The rubber compound as recited in claim 1, further comprising at least one additive.

3. The rubber compound as recited in claim 1, comprising 100 phr of the rubber;
an amount of the crosslinking agent such that the ratio of the SiH groups to the hydrosilylation-crosslinkable functional groups is 0.2-20;
0.05 to 100,000 ppm of the hydrosilylation catalyst system;
5 to 800 phr of the at least one filler, and
0.5 to 30 phr of coagent.

4. The rubber compound as recited in claim 3, wherein the ratio of the SiH groups to the hydrosilylation-crosslinkable functional groups is 0.5-5.

5. The rubber compound as recited in claim 4, wherein the ratio of the SiH groups to the hydrosilylation-crosslinkable functional groups is 0.8-1.2.

6. The rubber compound as recited in claim 3, wherein the amount of hydrosilylation catalyst system is 0.1 to 5,000 ppm.

7. The rubber compound as recited in claim 3, wherein the amount of filler is 10 to 200 phr of nonmagnetic fillers or 200 to 600 phr of magnetic or magnetizable fillers.

8. The rubber compound as recited in claim 3, wherein the amount of coagent is 1 to 10 phr.

9. The rubber compound as recited in claim 2, comprising 0.1 to 20 phr of the at least one additive.

10. The rubber compound as recited in claim 1, wherein the ethylene-propylene-diene rubber (EPDM) is a norbornene derivative with a vinyl group.

11. The rubber compound as recited in claim 10, wherein the norbornene derivative with a vinyl group is 5-vinyl-2-norbornene.

12. The rubber compound as recited in claim 1, wherein the average molecular weight of the rubber is between 5,000 and 100,000 g/mol.

13. The rubber compound as recited in claim 12, wherein the average molecular weight of the rubber is between 5,000 and 60,000 g/mol.

14. The rubber compound as recited in claim 1, wherein the hydrosilylation catalyst system is selected from hexachloroplatinic acid, platinum(0)-1,3-divinyl-1,1,3,3-tetramethyldisiloxane complex, dichloro(1,5-cyclooctadiene)platinum (II), dichloro(dicyclopentadienyl)platinum(II), tetrakis (triphenylphosphine)platinum(0), chloro(1,5-cyclooctadiene)rhodium(I) dimer, chlorotris (triphenylphosphine)rhodium(I) and/or dichloro(1,5-cyclooctadiene)palladium(II).

15. The rubber compound as recited in claim 14, further comprising a kinetic regulator selected from dialkyl maleate, in particular dimethyl maleate, 1,3,5,7-tetramethyl-1,3,5,7-tetravinylcyclosiloxane, 2-methyl-3-butyn-2-ol and/or 1-ethynylcyclohexanol.

16. The rubber compound as recited in claim 1, wherein the at least one filler is selected from carbon black, graphite, silica, silicate, metal oxide, metal hydroxide, carbonate, glass beads, fibers and/or organic filler.

17. The rubber compound as recited in claim 2, wherein the at least one additive is selected from antiaging agents, antioxidants, ozone protectants, flame retardants, hydrolysis protectants, adhesive agents, mold release agents and/or agents to reduce stickiness of parts, dyes and/or pigments, plasticizers and/or processing aids.

18. The method for manufacturing the rubber compound as recited in claim 1, wherein the crosslinking agent and the hydrosilylation catalyst system are added as a single-component system or as a two-component system to the rubber mixed with at least one filler and the coagent, then all the components are mixed together and the product is processed by an injection molding method and/or a (liquid) injection molding method ((L)IM), by pressing, and/or a compression molding method (CM), by a transfer molding method (TM) or by a method derived therefrom, a printing method such as screen printing, by spot application, dipping or spraying.

19. The method for manufacturing the rubber compound as recited in claim 2, wherein the crosslinking agent and the hydrosilylation catalyst system are added as a single-component system or as a two-component system to the rubber mixed with at least one filler, the coagent and the at least one additive, all the components are mixed and then the product is processed by an injection molding method and/or a (liquid) injection molding method ((L)IM), by compression, and/or a compression molding method (CM), by a transfer molding method (TM) or by a method derived therefrom, a printing method, e.g., screen printing, by application of spots, by dipping or spraying.

20. A method for utilizing the rubber compound as recited in claim 1 comprising utilizing the rubber compound as a material in the area of production, shipping, process technology and packaging of foodstuffs.

21. The method for utilizing the rubber compound as recited in claim 20, wherein the area of production, shipping, process technology and packaging of foodstuffs is drinking water or medical or pharmaceutical products or in the field of the electronics industry.

22. A method for utilizing the rubber compound as recited in claim 1 comprising utilizing the rubber compound as a material for gaskets and/or impregnations, coatings, membranes or adhesive compounds for hoses, valves, pumps, filters, humidifiers, reformers, storage vessels (tanks), vibration dampers, acoustically active components, for coatings on woven and nonwoven fabrics, electromagnetic shields, tires, brake sleeves, brake parts, axle boots, folded bellows, and/or for floor coverings and/or sections.

23. The method for utilizing the rubber compound as recited in claim 22, wherein the floor coverings and/or sections are for use in the area of foods, drinking water, medicine, pharmaceuticals and/or electronics.

24. The rubber compound as recited in claim 1 wherein the rubber is ethylene-propylene-diene rubber (EPDM) and the hydrosilylation-crosslinkable coagent is 1,2-polybutadiene.

25. The rubber compound as recited in claim 1 wherein the hydrosilylation-crosslinkable coagent is 1,6-hexanediol diacrylate.

26. The rubber compound as recited in claim 1 wherein the rubber is polyisobutylene rubber and the hydrosilylation-crosslinkable coagent is trimethylpropane triacrylate.

27. The rubber compound as recited in claim 1 wherein the rubber is polyisobutylene rubber and the hydrosilylation-crosslinkable coagent is triallyl isocyanurate.

28. The rubber compound as recited in claim 1 wherein the rubber is acrylonitrile-butadiene rubber and the hydrosilylation-crosslinkable coagent is triallyl isocyanurate.

29. The rubber compound as recited in claim 1 wherein the rubber is acrylate rubber and the hydrosilylation-crosslinkable coagent is triallyl isocyanurate.

30. The rubber compound as recited in claim 1 wherein the rubber is acrylate rubber and the hydrosilylation-crosslinkable coagent is triacrylate.

31. The rubber compound as recited in claim 1 wherein the rubber is acrylate rubber and the hydrosilylation-crosslinkable coagent is 1,2-polybutadiene.

* * * * *